E. BROWN.
Revolution Indicators.
No. 154,640. Patented Sept. 1, 1874.
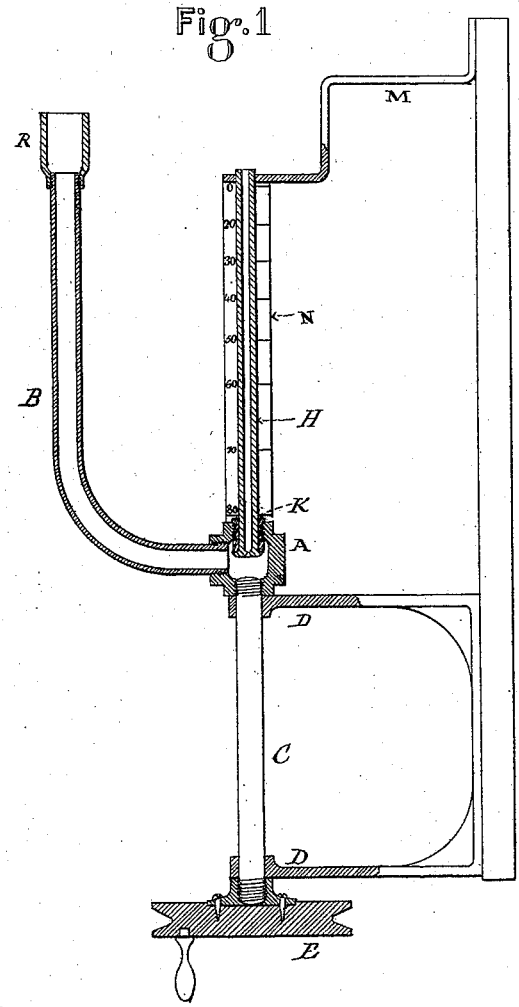
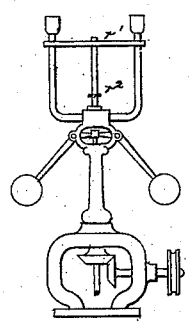
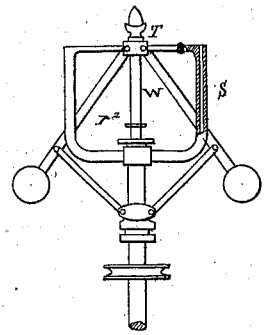
Witnesses:
Parks McFarland, Jr.
John F. Grant
Inventor.
Edward Brown

UNITED STATES PATENT OFFICE.

EDWARD BROWN, OF PHILADELPHIA, PENNSYLVANIA.

IMPROVEMENT IN REVOLUTION-INDICATORS.

Specification forming part of Letters Patent No. 154,640, dated September 1, 1874; application filed March 14, 1874.

*To all whom it may concern:*

Be it known that I, EDWARD BROWN, of 311 Walnut street, Philadelphia, Pennsylvania, have invented an Improved Revolution-Indicator, of which the following is a specification:

The nature of my invention consists in constructing the instrument so as to make it available for the use of a column of mercury in the central glass tube, whereby the instrument is rendered more sensitive, more accurate, and more durably correct than any at present in use.

The instrument is more easily filled and adjusted by the purchaser when it arrives at its journey's end than are those instruments depending for their operation upon two fluids of different specific gravity. The difficulty heretofore experienced in accomplishing this has been so great as to make the instrument practically unsaleable. I accomplish this by making the mercury-reservoir in the form of a bent pipe, which rotates on a central axis around a glass tube. The mercury in the glass tube is in direct communication with the mercury in the iron pipe, so that the variation in pressure caused by centrifugal force is communicated to the mercury in the glass tube, which indicates by its rise and fall the varying velocity due to the number of revolutions made per minute. This form of instrument admits of the use of a column of mercury in the glass tube, which is not subject to a varying level caused by evaporation, as in instruments heretofore used. A small amount of mercury is needed to fill the instrument.

Referring to the drawing, Figure 1 is an elevation of the instrument, partly in section. Figs. 2 and 3 show various modes of attaching it to the steam-engine.

A is a hollow iron casting. B is a bent iron pipe screwed into the casting A. C is a shaft screwed into the casting A, and turning in suitable bearings D. A driving-pulley, E, gives motion to the instrument. H is a glass tube, with the lower end turned up with a lip. It is put through an india-rubber washer, K, and the washer screwed into the casting A. As an additional security, the washer K may be secured by the usual stuffing-box common to glass water-gages. An arm, M, projects from the frame P, to steady the end of the glass tube, and to which is secured the scale N, graduated so that the level of the mercury and the indication on the scale correspond to the number of revolutions per minute of the steam-engine, to which the instrument may be applied. The upper end of the pipe B terminates just above the level of the mark 0 on the scale N, and is there connected to a short pipe, R, of larger diameter, so that a great fluctuation of the mercury in the glass tube will have but little effect upon the level of the mercury in the enlarged pipe R. The opening in the lower end of the glass tube is contracted, to prevent the sudden fluctuation of the mercury, and render its indications more definite. Colored water or alcohol may also be used, provided its proper level be constantly maintained.

Two arms can be used, as in Fig. 2, in order to balance the instrument, an opening being made for the glass through the short connecting-links $r^1$. An india-rubber band is placed on the glass at $r^2$, to indicate the level of the mercury when the engine is running at the correct speed.

Fig. 3 shows a convenient mode of applying the instrument to a steam-engine by making it a part of the governor. In this arrangement, one of the slotted arms S, which arms usually guide and propel the governor-balls, is made hollow, for the reception of mercury, and is in communication with the glass tube W. The arms S join at the top, and support the governor-balls from the hinge T.

All that is required to complete the instrument after it is fixed is to pour mercury into the pipe B until it stands in the glass tube at the height indicating 0, and set the engine in motion. The mercury will fall in the glass tube corresponding to the velocity of rotation.

I claim—

1. The pipe B, rotating around the glass tube H, as and for the purpose herein described.

2. The combination of the pipe B, the casting A, the glass tube H, the steadying-arm M, arranged and operating substantially as herein described.

3. The hollow rotating arm S and the glass tube W, as shown in Fig. 3, combined and operating in a steam-engine governor, and forming a part thereof, substantially as and for the purpose herein shown and described.

EDWARD BROWN.

Witnesses:
PARK MCFARLAND, Jr.,
JOHN F. GRANT.